June 5, 1928.

J. J. SLOYAN

HEAT GENERATOR

Filed Feb. 25, 1928

INVENTOR
Jerome J. Sloyan
BY C. Campbell Hunicke
ATTORNEY

June 5, 1928.

J. J. SLOYAN 1,672,002

HEAT GENERATOR

Filed Feb. 25, 1928

INVENTOR
Jerome J. Sloyan
BY
ATTORNEY

Patented June 5, 1928.

1,672,002

UNITED STATES PATENT OFFICE.

JEROME J. SLOYAN, OF RED BANK, NEW JERSEY.

HEAT GENERATOR.

Application filed February 25, 1928. Serial No. 256,921.

This invention relates to a heat generator.

In many instances, such as case hardening furnaces, small smelters, rivet heating, preheating of castings before acetylene welding, for chemical laboratories, marine craft and direct drive railway motor cars, and portable heat generators a close control of temperature and power are required as well as relatively high temperatures with relatively high efficiencies.

One of the objects of this invention is to provide a heat generator that is portable. A further object of the invention is to provide a heat generator the temperature of which can be controlled easily and which will generate relatively high temperatures. A further object of the invention is to provide a heat generator of relatively high efficiency.

Referring to the drawings.

Figure 1:
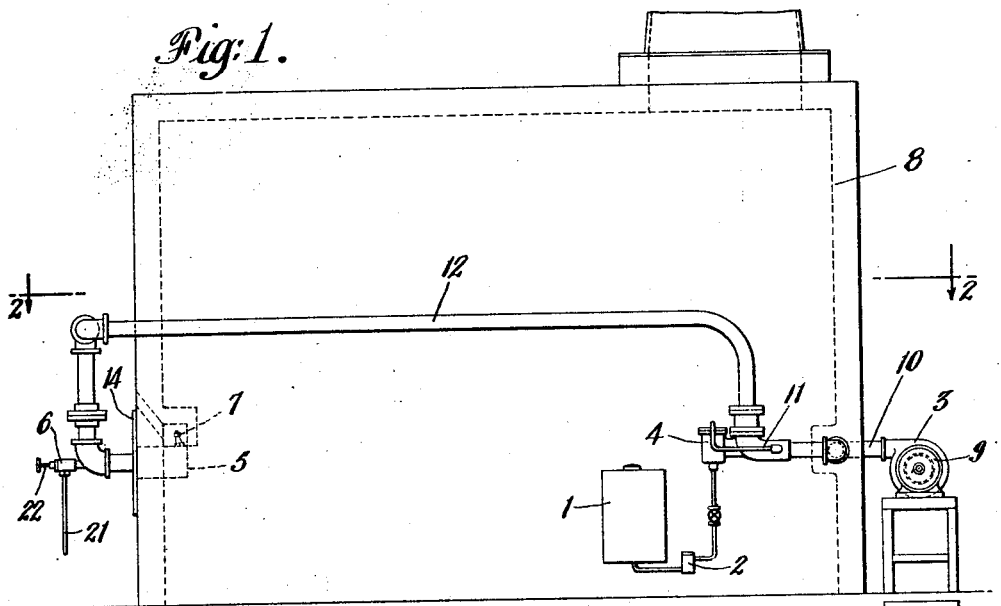
Figure 1 is a view in side elevation showing the application of my invention to a furnace.
Figure 2:
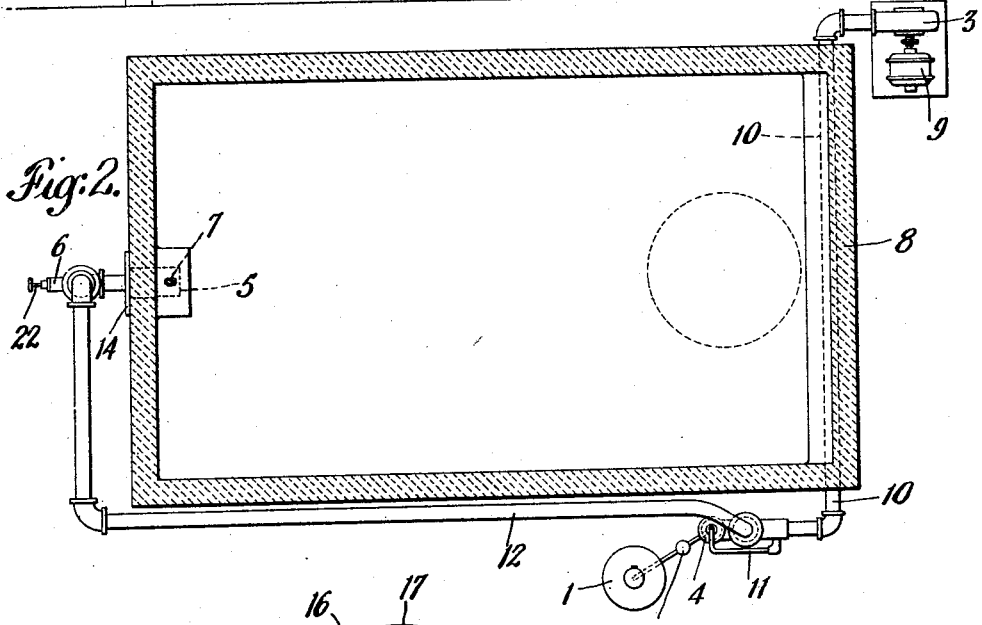
Figure 2 is a plan view of Figure 1 along the line 2, 2, looking in the direction of the arrows.
Figure 5:
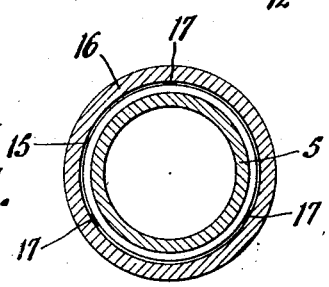
Figure 5 is a cross sectional view of Figure 3 along the line 5, 5, looking in the direction of the arrows. Liquid fuel is the most readily transportable fuel and hence best adapted for use in a portable heat generator.
Figure 4:
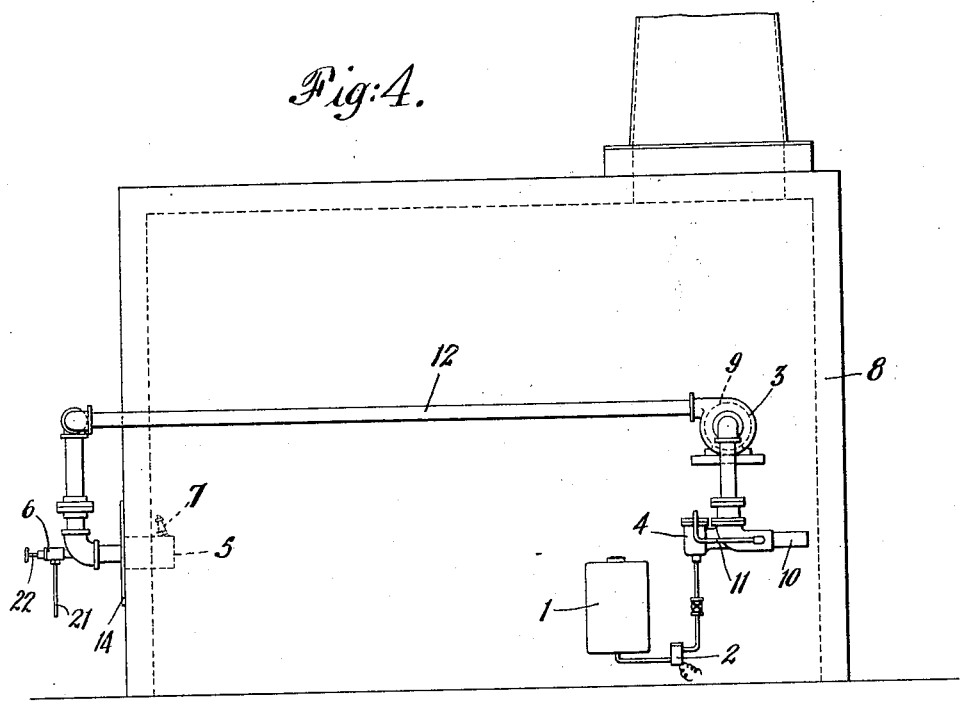
Figure 4 is a side view in elevation of a modified form of my device.
Figure 3:
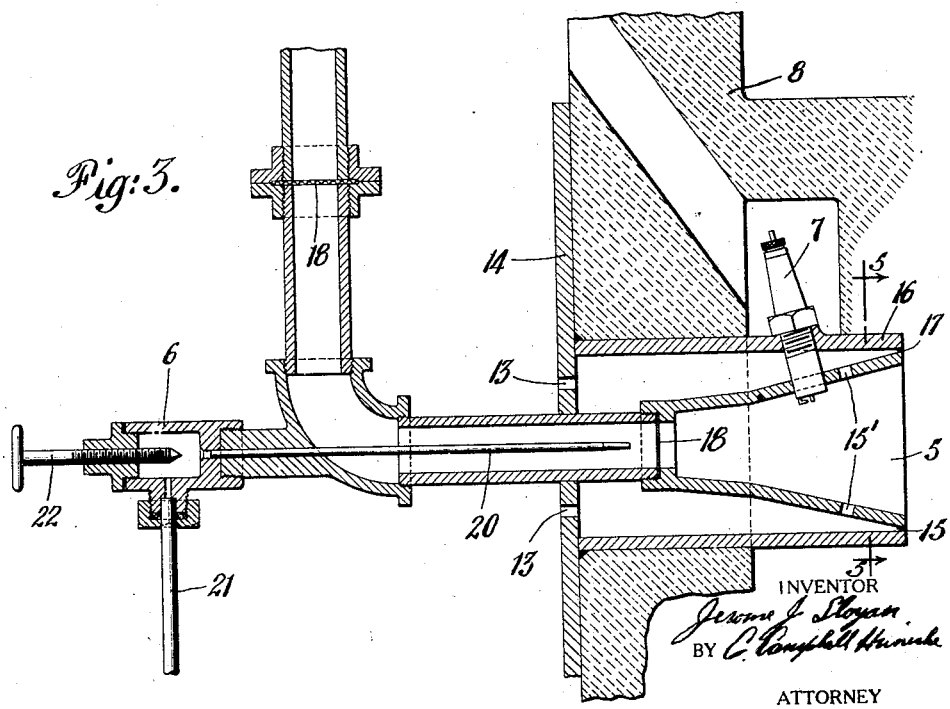
Figure 3 is a detailed view of the burner and primer.

The use of liquid fuel necessitates its vaporization by some form of carburation. The proportions of fuel and air should be constant regardless of the velocity of the air passing through the carburetor and of course a homogeneous mixture of fuel and air is required for proper burning. A further very important item is the maintenance of the pressure of the working parts of the carburetor the same as the pressure of the compressed air. This can be accomplished by sealing the carburetor and the utilization of the compressed air for carburation. The heat generator consists of a fuel tank 1, pump 2, blower 3, carburetor 4, nozzle 5, primer 6, spark plug 7, source of high tension current, and a furnace housing 8. The blower 3 is preferably of the centrifugal type directly connected to an electric motor 9. For more efficient operation pipe 10 from the blower 3 to carburetor 4 passes through the furnace to permit of preheating of the air and the increasing of its velocity to the carburetor 4. Pipe 11 is led from pipe 10 to the carburetor float chamber, well and interpassages, so that the pressure on all the working parts of carburetor 4 will be the same as the pressure of the compressed air passing from blower 3 through pipe 10 and through the throat or mixing chamber of carburetor 4 to pipe 12 and nozzle 5. Nozzle 5 is preferably of the flare type with auxiliary air passages 13 in the flange 14 of nozzle 5 and around the mouth of the nozzle proper to ports 15, 15' between nozzle 5 and sheath 16. The nozzle 5 is welded at several points 17, to sheath 16. The length of pipe 12 between the carburetor and the nozzle should be not so long as to permit condensation in the pipe nor so short as to permit the heat from the nozzle to be carried back to the carburetor.

I propose to provide two or more safety fire screens 18 between the carburetor and the nozzle. The first is preferably located at the base of the nozzle proper. For starting purposes I provide a spark plug 7 located on the top of sheath 16 and extending therethrough into nozzle 5. The spark plug should be back of the auxiliary air holes 15, 15', at the mouth of the nozzle. Such location of spark plug 7 will ignite the gas but the flame will not be in contact with the plug due to the formation of the fire cone beyond the nozzle. Likewise for starting I provide primer 6 comprising pipe lead 21 primer needle valve 22, and pipe 20 within feed line pipe 12. The needle valve 22 being located just outside the entrance of the primer feed line into main fuel line pipe 12. On starting the priming liquid sprays against the screen and passes through the nozzle 5 where it is ignited by the high tension current by means of the spark plug 7. The design of nozzle 5 having auxiliary air ports 13, 15 and 15' in connection with a mixture slightly rich in liquid fuel prevents excessive heating of the nozzle because of the passing of the auxiliary air between the sheath 16 and the nozzle 5 and ports 15, 15', which prevent the formation of the fire cone within the nozzle 5. Such construction also enlarges the capacity for any given size of carburetor and furnishes automatically the proper amount of air for complete combustion purposes and thereby increases the efficiency of the heat generator. Should any condensation of the liquid fuel, particularly at starting take place, it will pass into the chamber between the sheath and the nozzle where it is ignited. The nozzle 5 and sheath 16 are tilted at a slight angle not over five degrees in order that any condensate will run into the chamber and become ignited.

The operation of the device is as follows: The vibrating pump switch 2 of the fuel line is closed and likewise the ignition switch. The priming valve 6 is then opened and after the fuel is ignited the blower switch is closed and the priming valve is likewise closed. The carburetor through the throttle or butterfly valve can then be adjusted for the capacity or temperature desired. In the modified form the blower 3 operates as a pull and push blower, that is, it is located between the carburetor and the nozzle. With some types of carburetors this modification, although not the preferable form, may be required as it is more in conformity with the conditions under which the carburetors have been designed.

It will thus be seen that I have invented a portable heat generator that can be controlled accurately and in which combustion is complete and of relatively high operating efficiency. Tests in a case hardening furnace 20" by 10" by 10" showed efficiencies ranging from 59.2% to 62%. Temperatures over 3000 degrees Fahrenheit being readily obtainable in a few minutes starting with a cold oven.

What I claim is:

1. A heat generator comprising a source of liquid fuel supply, a carburetor, means for delivering the fuel to said carburetor, pipe connections between said source of supply, delivering means and carburetor, a sheathed nozzle, auxiliary air ports in the rear flange of the nozzle between the nozzle and the sheath and ports at the front end of said nozzle, a blower, pipe connections between said blower and nozzle, said carburetor connected to said blower and nozzle pipe line and means for maintaining the air pressure in the carburetor the same as the compressed air from the blower to the nozzle.

2. A heat generator comprising a source of liquid fuel supply, a carburetor, means for delivering the fuel to said carburetor, pipe connections between said source of supply, delivery means and carburetor, a nozzle, means for admitting auxiliary secondary air to the front of said nozzle, a spark plug in the forward end of said nozzle behind said means for admitting auxiliary air, a fire screen in the rear of said nozzle, a primer adjacent the nozzle, a blower, pipe connections between said blower and nozzle, said carburetor delivering into said blower and pipe line and means for maintaining the air pressure in the carburetor the same as the compressed air from the blower to the nozzle.

Signed at New York, in the county of New York and State of New York, this 21st day of February A. D. 1928.

JEROME J. SLOYAN.